Patented Oct. 1, 1940

2,216,548

UNITED STATES PATENT OFFICE 2,216,548

PROCESS FOR PRODUCTION OF UNSATURATED AMINES

Willard Converse, Berkeley, Calif., assignor to Shell Development Company, San Francisco, Calif., a corporation of Delaware No Drawing. Application December 2, 1938, Serial No. 243,547

10 Claims. (Cl. 260—585)

This invention relates to the production of useful unsaturated amines, and it more particularly relates to the production of primary alkenyl amines.

The process of the invention comprises reacting an alkenyl halide of the allyl type with an aqueous ammonia solution, the reactants being present in such relative proportions and the reaction being effected under conditions so controlled that the alkenyl halide reacts with ammonia to the extent that the resulting reaction mixture after neutralization consists of a mixture of alkenyl amines materially predominating in the primary alkenyl amine.

The unsaturated halides which are converted to the corresponding primary unsaturated amines in accordance with the process of my invention are of the allyl type and are devoid of unsaturated tertiary carbon atoms in the adjacent position to the halogenated carbon atom. These allyl type unsaturated halides are characterized by embracing in their structure the group

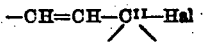

wherein Hal represents a halogen atom and the $C^{II}$ carbon atom is saturated and monohalogenated, that is, linked to only one halogen atom. The loose bonds of this $C^{II}$ carbon atom may be taken up by hydrogen atoms, and/or by the same or different alkyl, alkenyl, aryl, aralkyl, aralkenyl, cycloparaffinic, cyclo-olefinic and the like organic radicals which may be further substituted, it being understood that the carbon atom in the compound which is represented by $C^{II}$ is saturated and monohalogenated.

It is seen that the lowest members of the group of unsaturated halides to which the process of the invention is applicable are the allyl halides, for example, allyl chloride, allyl bromide, and allyl iodide. Other representative members of the group are: $CH_3$—$CH$=$CH$—$CH_2Cl$, $CH_3$—$CH$=$CH$—$CH_2Br$, $CH_2$=$CH$—$CHCl$—$CH_3$, $CH_2$=$CH$—$CHBr$—$CH_3$, $C_2H_5$—$CH$=$CH$—$CH_2Cl$, $CH_3$—$CH$=$CH$—$CHCl$—$C_2H_5$, $CH_2$=$CH$—$C(CH_3)_2Cl$, $C_6H_5$—$CH$=$CH$—$CH_2Cl$,

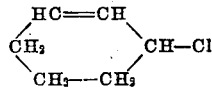

and the like and their homologues, analogues and suitable substitution products. The individual unsaturated halides or mixtures thereof may be applied depending upon whether a single species or a mixture of species of primary allyl type unsaturated halides is desired as the principal product.

One of the objects of my invention is to provide a practical and economical process adapted to the technical scale production of primary allyl amine by the reaction of allyl chloride with ammonia.

It is known that allyl chloride can be reacted with ammonia to result in the formation of primary allyl amine. However, as far as I am aware, no one has provided any method of effecting the reaction so as to obtain any practical yield of the primary allyl amine. The known methods always result in reaction products wherein the secondary and tertiary amines, rather than the desired primary allyl amine, materially predominate. This is because of the great reactivity under the conditions of its formation of the first formed primary allyl amine. Unless the reaction is effected under special conditions hereinafter specified, the reactive primary allyl amine reacts, substantially as soon as it is formed, with more of the allyl chloride present in the reaction mixture to form the undesired secondary and tertiary allyl amines.

Now, I have found a practical and economical process in accordance with which allyl type halides of the group herein defined can be reacted with ammonia to produce a reaction product materially predominating in the corresponding primary allyl type unsaturated amine. By operating in accordance with the process of the invention, I have been able to produce such primary allyl type unsaturated amines at low cost and as a result have made them available for commercial use.

One of the principal factors in controlling the reaction of the allyl type halide with ammonia to obtain predominately a primary allyl type amine is the mol ratio of the ammonia to unsaturated halide in the reaction mixture. The successful execution of the process of the invention necessitates effecting the reaction with an ammonia to unsaturated halide mol ratio in the reaction mixture of at least 5, and preferably in the range of from 5 to 15. Although higher as well as lower mol ratios of the reactants may be used in some cases, their use is in general not practicable. The use of ratios lower than 5 results in prohibitively high yields of the undesired secondary, tertiary and quaternary amines, and slows down the desired reaction considerably. Ratios higher than 15 are generally not desirable because of the increased difficulty, particularly in the case of the lower primary unsaturated amines, of recovering the primary unsaturated amine from the great excess of ammonia.

Another important factor in controlling the reaction to obtain predominately a primary allyl amine is the time that the reactants are in intimate contact with each other under reaction conditions. It is desirable that the reaction be effected at a temperature at which the primary reaction proceeds rapidly, but it is essential to the attainment of the best results that the time at which the reactants are in contact with each other and the primary reaction product at said reaction temperature be reduced to a minimum. Thus, the minimum contact time to effect the desired extent of conversion of the applied unsaturated halide is employed, and, to insure intimate contact of the reactants during such minimum time of contact, it is desirable to intensively agitate the reaction mixture by mechanical stirring or other suitable means. It is desirable to obtain substantially complete reaction of the unsaturated halide and the ammonia in the reaction zone so that there will be substantially no unreacted unsaturated halide to react under the less favorable conditions under which the amine product is isolated. Thus, formation of undesirable products is reduced to a minimum and separation of the components of the amine product is facilitated.

A suitable temperature of operation is from about 50° C. to 150° C. A preferred operating temperature, particularly with the lower allyl type halides, is from 90° C. to 120° C. It is desirable to effect the reaction in the liquid phase under a superatmospheric pressure at least equal to the combined vapor pressures of the constituents of the reaction mixture at the reaction temperature. The pressure in the reaction system will depend upon the particular unsaturated halide reacted, upon the ratio of the reactants, upon whether anhydrous or aqueous ammonia is applied, and upon the particular temperature of operation.

The reaction may be effected in the presence or absence of water. Liquid anhydrous ammonia may be applied and the reaction effected under a pressure sufficiently high to insure the presence of liquid ammonia. In general, because lower operating pressures, and consequently less expensive equipment, can be used, I prefer to employ aqueous solutions of ammonia. An aqueous ammonia solution of any desirable concentration may be employed. Aqueous ammonia solutions having ammonia concentrations of from about 20% to 70% are suitable.

The optimum time that the reactants are in intimate contact with each other, that is, the time that the reaction mixture is intensively agitated as by mechanical stirring, will depend, among other factors, upon the particular unsaturated halide, upon the mol ratio of the reactants, upon the pressure of operation, and upon the temperature of the stirred mixture. When the reaction mixture contains the unsaturated halide and ammonia in the mol ratio of from 5 to 15, the reaction mixture is preferably intensively agitated, as by stirring, for from 1 to 15 minutes while it is at a temperature in the range of 50° C. to 150° C. Since the rate of reaction is generally quite low in the absence of agitation, the process may in some cases be executed by contacting the reactants in the desired proportions, heating the mixture to the desired reaction temperature, and then stirring or otherwise intensively agitating the mixture until substantially all of the unsaturated halide has reacted. The best yields of the desired primary amine appear to be obtained when all conditions are so adjusted that complete reaction of the unsaturated halide is obtained as rapidly as possible.

Although the reaction can in most cases be made to go at a sufficiently high rate without the use of a catalyst, suitable catalysts may, if desired, be employed to accelerate the reaction. Among the catalysts which may be advantageously used are the heavy metals such as copper, silver, etc., and some heavy metal compounds.

The process may be carried out in any suitable type of apparatus. For example, the unsaturated halide and the anhydrous or aqueous ammonia, in the desired relative amounts, may be charged in any suitable manner to a reaction vessel of appropriate size, such as an autoclave, capable of withstanding the pressure to be developed and equipped with suitable heating and cooling means and means for agitating its contents as by mechanical stirring.

The process may be executed in a batch, intermittent or continuous manner. The process may be made continuous by continuously feeding into an autoclave type of reactor, such as that above-described, the reactants, singly or in admixture, in the desired proportions, and continuously withdrawing a portion of the reaction mixture. Any unreacted ammonia and/or unsaturated halide may be recovered from the withdrawn reaction mixture and returned to the reaction vessel for reutilization therein. If desired, the process can be executed in a continuous manner in a so-called tubular reactor. The tubular reactor may comprise reaction tubes of the requisite size connected in series through which the mixture comprising the reactants in the required relative amounts is caused to flow under the desired conditions of temperature, pressure and contact time. Throughout the length of the tubes, orifice plates or baffles may be provided at such intervals as to keep the reaction mixture in violent turbulence.

In some cases, it may be desirable to effect the reaction in the presence of an extraneous basic metal compound. If so, suitable agents for this purpose are the basic metal oxides and hydroxides, the metal carbonates, the metal bicarbonates, etc. If desired, the reaction may be executed in the presence of a suitable solvent or diluent material which is preferably a normally liquid organic solvent substantially inert under the conditions of operation. Suitable solvents for this purpose are the hydrocarbons and hydrocarbon mixtures, particularly those which are normally liquid such as gasoline, benzene, hexane, octane, and the like. The alcohols, particularly the aliphatic monohydric alcohols such as ethanol, the propanols, the butanols, etc., are, in some cases, conveniently employed extraneous solvents or diluents. In some cases, it may be advantageous to execute the reaction in the substantial absence of water, using an ammonia-alcohol solution rather than an aqueous ammonia solution. The chief advantages in the use of alcohol-ammonia solutions are reduced corrosion of the interior surfaces of steel or iron reaction vessels and conduits, and, in some cases, greater ease of separation of the desired reaction product or products from the reaction mixture. The alcohol can be selected with respect to the treated unsaturated halide and the primary unsaturated amine product so that it has a boiling temperature permitting it to be readily separated therefrom. The separated alcohol or other solvent may be reutilized, for example, by recycling it back to the reactor. Apart from or in conjunction with the use of an alcohol, any other suitable corrosion-inhibiting means may be used when necessary or desirable.

The desired primary unsaturated amine or amines may be recovered from the reaction mixture in any suitable manner, the specific mode of recovery being adapted to the particular reaction mixture treated and the nature of the product or products to be recovered. The typical mixture resulting from the reaction of an unsaturated allyl type halide with an excess of an aqueous ammonia solution in accordance with the process of the invention comprises the primary unsaturated amine, relatively much smaller amounts of the secondary-, tertiary- and quaternary-unsaturated amines, a hydrogen halide (most of which is bound to the amines in the form of their hydrohalides), water, unreacted ammonia, ammonium halide and unreacted unsaturated halide. The primary unsaturated amine can, for example, be recovered from such a reaction mixture in the following manner. The mixture is subjected to distillation, preferably a fractional distillation, to remove the unreacted ammonia and the unreacted unsaturated halide. It is generally desirable to remove substantially all of the unreacted unsaturated halide during the initial distillation step and avoid contamination of the primary unsaturated amine at a later stage in the recovery treatment. The residue of the reaction mixture is then neutralized by the addition of a suitable neutralizing agent, such as a basic metal oxide, hydroxide, bicarbonate, carbonate, basic salt, etc., in an amount at least sufficient to neutralize all of the hydrogen halide present therein and liberated from the amine hydrohalides. During the neutralization of the hydrogen halide, any quaternary unsaturated amine present is converted to the corresponding substantially non-volatile quaternary hydroxide. The neutralized mixture is then subjected to fractional distillation to recover the primary unsaturated amine, in the form of its azeotrope with water in the case that the particular primary unsaturated amine is capable of forming such an azeotrope. The smaller amounts of secondary and tertiary amines remaining in the residue can be recovered therefrom by steam distillation. In the case that the rate of steam distillation of the secondary or tertiary amines is prohibitively low, the greater part of these compounds can, in some cases, be removed as an upper layer from the distillation kettle residue after removal of the primary unsaturated amine by distillation.

The following specific examples illustrate suitable modes of executing the process of the invention. The examples are for illustrative purposes and the invention is not to be regarded as limited to the specific reactants, conditions, or modes of operation therein described.

*Example I*

About 16.2 mols of allyl chloride and about 162 mols of ammonia (in the form of a 28% aqueous ammonia solution) were charged to a suitable reaction vessel equipped with heating and cooling means and means for intensively stirring its contents. The contents of the closed reaction vessel were heated to about 97° C. without stirring. The stirrer was then started and the mixture stirred vigorously for about 2 minutes while maintaining the temperature at from about 97° C. to 105° C. During the stirring period, the pressure in the reaction vessel was from about 125 to 220 lbs./sq. in. (gauge). After about 2 minutes of stirring, the stirrer was stopped and the contents of the reaction vessel cooled rapidly.

The cooled reaction mixture was discharged from the reaction vessel, subjected to a fractional distillation to separate unreacted ammonia and allyl chloride. The residue of the distillation was neutralized with sodium hydroxide and distilled to remove the primary allyl amine (B. P. 53° C.).

The secondary and tertiary allyl amines were recovered by steam distillation of the residue after removal of the primary allyl amine.

Substantially all of the applied allyl chloride was reacted. The yield of primary allyl chloride based on the applied allyl chloride was about 77.1 mol %. The mol per cent yield of the secondary allyl amine was about 6.0%, and that of the tertiary allyl amine only about 1.9%.

*Example II*

A mixture of straight chain butenyl chlorides (1-chlorobutene-2 and 3-chlorobutene-1) boiling in the temperature range of from about 62° C. to 86° C. was reacted with an aqueous ammonia solution in a similar apparatus and in substantially the same manner as described in Example I.

About 2.75 mol of the butenyl chloride mixture and about 13.75 mols of ammonia (563 cc. of a 50% aqueous ammonia solution) were charged to the reaction vessel. The temperature of the mixture was raised to about 50° C. before stirring. The stirrer was then started and the mixture stirred vigorously for about 7 minutes while the temperature was kept in the range of from 50° C. to 75° C. The pressure during the stirring period was from about 80 to 200 lbs. per sq. in (gauge). After about 7 minutes of stirring, the reaction mixture was cooled rapidly, and the cooled reaction mixture discharged from the reaction vessel.

The reaction products were recovered in substantially the same manner as described in the foregoing example. A mixture of primary butenyl amines ($CH_3$—$CH$=$CH$—$CH_2$—$NH_2$ and $CH_2$=$CH$—$CH(NH_2)$—$CH_3$), boiling in the approximate temperature range of 82° C. to 91° C., was obtained in a yield of about 60 mol % of the applied butenyl chloride mixture. Some secondary-, tertiary- and quaternary butenyl amines were formed, but the resulting mixture of amines materially predominated in the primary butenyl amines.

The primary unsaturated amines prepared in accordance with the process of the invention are adapted to a wide variety of uses. They are useful raw materials in the production of a wide variety of valuable chemicals such as medicinal preparations, dye-stuffs, soaps, resins, etc. In addition, they are valuable solvents and components of solvent mixtures.

While I have described my invention in a detailed manner and provided specific examples illustrating suitable modes of executing the same, it is to be understood that modifications can be made and that no limitations other than those imposed by the scope of the appended claims are intended.

I claim as my invention:

1. The method of reacting allyl chloride with an aqueous ammonia solution to obtain predominantly the primary allyl amine which comprises contacting allyl chloride with an aqueous ammonia solution in the ratio of 1 mol of allyl chloride to about 10 mols of ammonia and effecting rapid reaction by intensively agitating the mixture for about 2 minutes at a temperature of about 100° C., and recovering the primary allyl amine from the resulting mixture in which it materially predominates over other amine products.

2. The method of reacting allyl chloride with an aqueous ammonia solution to obtain predominantly the primary allyl amine which comprises contacting allyl chloride with an aqueous ammonia solution in the ratio of one mol of allyl chloride to from 5 to 15 mols of ammonia and effecting rapid reaction by intensively agitating the mixture for from 1 to 10 minutes at a temperature of from 50° C. to 150° C., and recovering the primary allyl amine from the resulting mixture in which it materially predominates over other amine products.

3. The method of reacting crotyl chloride with an aqueous ammonia solution to obtain predominantly a primary crotyl amine which comprises contacting crotyl chloride with an aqueous ammonia solution in the ratio of one mol of crotyl chloride to from 5 to 15 mols of ammonia and effecting rapid reaction by intensively agitating the mixture to provide intimate contact of the reactants for from 1 to 10 minutes at a temperature of 50° C. to 150° C., and recovering a primary crotyl amine from the resulting mixture in which it materially predominates over other amine products.

4. The method of reacting a normal butenyl chloride with an aqueous ammonia solution to obtain predominantly a primary normal butenyl amine which comprises contacting a normal butenyl chloride of the allyl type with an aqueous ammonia solution in the ratio of 1 mol of the butenyl chloride to from 5 to 15 mols of ammonia and effecting rapid reaction by intensively agitating the mixture for from 1 to 10 minutes at a temperature of from 50° C. to 150° C. to provide intimate contact of the reactants and recovering the primary normal butenyl amine from the resulting mixture in which it materially predominates over other amine products.

5. The method of reacting an allyl halide with an aqueous ammonia solution to obtain a mixture of allyl amines materially predominating in primary allyl amine which comprises contacting an allyl halide with an aqueous ammonia solution in the ratio of one mol of the allyl halide to at least 5 mols of ammonia, and effecting reaction by heating the mixture at a temperature of from 50° C. to 150° C. for from 1 to 15 minutes while intensively agitating the same.

6. The method of reacting an allyl halide with ammonia to produce a mixture of allyl amines materially predominating in primary allyl amine which comprises contacting an allyl halide with ammonia in the ratio of one mol of the allyl halide to at least 5 mols of ammonia and effecting the reaction by intensively agitating the same for from 1 to 15 minutes while heating the mixture at a temperature of 50° C. to 150° C.

7. The method of reacting a chlorinated unsaturated hydrocarbon with ammonia to obtain predominantly a primary unsaturated allyl type amine which comprises contacting a chlorinated unsaturated hydrocarbon of the general formula

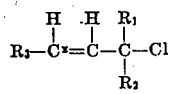

wherein $R_1$ and $R_2$ are radicals selected from the group consisting of the hydrogen atom and hydrocarbon radicals, and $R_3$ is a radical selected from the group consisting of the hydrogen atom and hydrocarbon radicals linked to the $C^x$ carbon atom by means of a carbon atom of the group consisting of the primary and secondary carbon atoms, with ammonia in the ratio of one mol of the unsaturated chloride to at least five mols of ammonia, and effecting reaction by heating the mixture at a temperature of from 50° C. to 150° C. for from 1 to 15 minutes while intensively agitating the same.

8. The method of reacting a halogenated unsaturated hydrocarbon with ammonia to obtain predominantly a primary unsaturated allyl type amine which comprises contacting a halogenated unsaturated hydrocarbon of the general formula

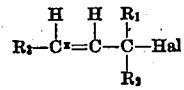

wherein Hal is a halogen, $R_1$ and $R_2$ are radicals selected from the group consisting of the hydrogen atom and hydrocarbon radicals, and $R_3$ is a radical selected from the group consisting of the hydrogen atom and hydrocarbon radicals linked to the $C^x$ carbon atom by means of a carbon atom of the group consisting of the primary and secondary carbon atoms, with ammonia in the ratio of one mol of the unsaturated halide to at least five mols of ammonia in the presence of a substantial amount of a liquid organic solvent which is substantially inert under reaction conditions, and effecting reaction by heating the mixture at a temperature of from 50° C. to 150° C. for from 1 to 15 minutes while intensively agitating the same to insure intimate contact of the reactants.

9. The method of reacting a halogenated unsaturated hydrocarbon with ammonia to obtain predominantly a primary unsaturated allyl type amine which comprises contacting a halogenated unsaturated hydrocarbon of the general formula

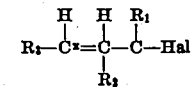

wherein Hal is a halogen, $R_1$ and $R_2$ are radicals selected from the group consisting of the hydrogen atom and hydrocarbon radicals, and $R_3$ is a radical selected from the group consisting of the hydrogen atom and hydrocarbon radicals linked to the $C^x$ carbon atom by means of a carbon atom of the group consisting of the primary and secondary carbon atoms, with an aqueous solution of ammonia in the ratio of one mol of the unsaturated halide to from 5 to 15 mols of ammonia, and effecting reaction by heating the mixture at a temperature of from 50° C. to 150° C. for from 1 to 15 minutes while intensively agitating the reaction mixture.

10. The method of reacting a halogenated unsaturated hydrocarbon with ammonia to obtain predominantly a primary unsaturated allyl type amine which comprises contacting a halogenated unsaturated hydrocarbon of the general formula

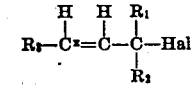

wherein Hal is a halogen, $R_1$ and $R_2$ are radicals selected from the group consisting of the hydrogen atom and hydrocarbon radicals, and $R_3$ is a radical selected from the group consisting of the hydrogen atom and hydrocarbon radicals linked to the $C^x$ carbon atom by means of a carbon atom of the group consisting of the primary and secondary carbon atoms, with ammonia in the ratio of one mol of the unsaturated halide to at least five mols of ammonia, and effecting reaction by heating the mixture at a temperature of from 50° C. to 150° C. for from 1 to 15 minutes while intensively agitating the same to provide intimate contact of the reactants.

WILLARD CONVERSE.